United States Patent
Abughazaleh (10) Patent No.: US 7,512,848 B1
(45) Date of Patent: Mar. 31, 2009

(54) CLOCK AND DATA RECOVERY CIRCUIT HAVING OPERATING PARAMETER COMPENSATION CIRCUITRY

(75) Inventor: Firas N. Abughazaleh, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 923 days.

(21) Appl. No.: 10/954,391

(22) Filed: Sep. 29, 2004

(51) Int. Cl.
- *G01R 31/28* (2006.01)
- *G06F 11/00* (2006.01)
- *H03L 7/00* (2006.01)
- *H04L 12/28* (2006.01)
- *H04B 10/00* (2006.01)

(52) U.S. Cl. ............ 714/725; 714/707; 714/744; 327/141; 327/143; 370/395.62; 398/155; 398/158

(58) Field of Classification Search .......... 714/725, 714/707, 744; 327/141, 143; 370/395.62; 398/155, 158
See application file for complete search history.

(56) References Cited

U.S. PATENT DOCUMENTS

| | | | |
|---|---|---|---|
| 5,329,559 A * | 7/1994 | Wong et al. | 375/373 |
| 6,316,840 B1 * | 11/2001 | Otani | 257/787 |
| 6,448,839 B1 * | 9/2002 | Tomasini et al. | 327/378 |
| 6,522,015 B1 * | 2/2003 | Glenn et al. | 257/777 |
| 7,321,617 B2 * | 1/2008 | Garlett et al. | 375/224 |
| 2006/0208782 A1 * | 9/2006 | Sanduleanu et al. | 327/185 |

OTHER PUBLICATIONS

U.S. Appl. No. 10/346,435, filed Jan. 17, 2003, Brunn et al.
U.S. Appl. No. 10/683,944, filed Oct. 10, 2003, Young.

\* cited by examiner

*Primary Examiner*—Cynthia Britt
*Assistant Examiner*—John J Tabone, Jr.
(74) *Attorney, Agent, or Firm*—Timothy W. Markison; Michael T. Wallace (57) ABSTRACT

A clock and data recovery circuit includes even and odd latches, a detection module, a clock recovery module, a compensating module, and a data recovery module. The even and odd latches are operably coupled to latch even and odd bits of a digital stream of data based on a recovered clock to produce even and odd latched bits. The detection module is operably coupled to produce a phase representative pulse stream based on the even and odd latched bits. The clock recovery module is operably coupled to produce the recovered clock based on the phase representative pulse stream. The compensating module is operably coupled to adjust biasing of the even and odd latches based on operating parameter changes of the clock and data recovery circuit. The data recovery module is operably coupled to produce recovered data from the even and odd latched bits based on the recovered clock.

27 Claims, 8 Drawing Sheets

FIG. 1
programmable logic device 10

FIG. 2
MGT

FIG. 3
clock and data recovery circuit 20

FIG. 4
compensating module 35

FIG. 5
compensating module 35

FIG. 6
*latch*

FIG. 7
parameter compensating logic circuit

FIG. 8

CLOCK AND DATA RECOVERY CIRCUIT HAVING OPERATING PARAMETER COMPENSATION CIRCUITRY

FIELD OF THE INVENTION

This invention relates generally to data communications and more particularly to clock and data recovery circuits used for such data communications.

DESCRIPTION OF RELATED ART

Communication systems are known to transport large amounts of data between a plurality of end user devices, which, for example, include telephones, facsimile machines, computers, television sets, cellular telephones, personal digital assistants, etc. As is also known, such communication systems may be local area networks (LANs) and/or wide area networks (WANs) that are stand-alone communication systems or interconnected to other LANs and/or WANs as part of a public switched telephone network (PSTN), packet switched data network (PSDN), integrated service digital network (ISDN), the Internet, etc. As is further known, communication systems include a plurality of system equipment to facilitate the transporting of data. Such system equipment includes, but is not limited to, routers, switches, bridges, gateways, protocol converters, frame relays, private branch exchanges, etc.

The transportation of data within communication systems is typically governed by one or more standards that ensure the integrity of data conveyances and fairness of access for data conveyances. For example, there are a variety of Ethernet standards that govern serial transmissions within a communication system at data rates of 10 megabits per second, 100 megabits per second, 1 gigabit per second and beyond. Another standard, which is for fiber optic data conveyances, is Synchronous Optical NETwork (SONET) that provides a data rate of 10 gigabits per second. In accordance with such standards, many system components and end user devices of a communication system transport data via serial transmission paths. Internally, however, the system components and end user devices process data in a parallel manner. As such, each receiving system component and end user device must receive the serial data and convert the serial data into parallel data without loss of information.

Accurate recovery of information from high-speed serial transmissions typically requires transceiver components to operate at clock rates that are comparable to the rate of the received serial data, which, for today's high-speed systems, requires very high clock rates. Such high clock rates limit the usefulness of prior art clock and data recovery circuits since such clock and data recovery circuits require precise alignment of the received serial data with the high-speed clock to recover embedded timing in the data stream and/or to recover the data. This is difficult to achieve using today's integrated circuit (IC) fabrication techniques since the properties of the components of the clock and data recovery circuit vary over temperature, supply voltage, and/or IC fabrication process. In addition, the high-speed serial data requires the clock and data recovery circuits to have a bandwidth wide enough to handle the high-speed serial data, which is also difficult to achieve using today's integrated circuit fabrication techniques.

Therefore, a need exists for a clock and data recovery circuit that operates at high speeds and may be implemented using today's IC fabrication techniques with less susceptibility to the above mentioned limitations.

BRIEF SUMMARY OF THE INVENTION

The clock and data recovery circuit having operating parameter compensation circuitry of the present invention substantially meets these needs and others. In one embodiment of the present invention, a clock and data recovery circuit includes a latch, a detection module, a clock recovery module, and a compensating module. The latch is operably coupled to latch bits of a digital stream of data based on a recovered clock to produce latched bits. The detection module is operably coupled to produce a phase representative pulse stream based on the latched bits. The clock recovery module is operably coupled to produce the recovered clock based on the phase representative pulse stream. The compensating module is operably coupled to adjust biasing of the latch based on operating parameter changes of the clock and data recovery circuit. In some embodiments, the latch is an even latch operably coupled to latch even bits of the digital stream of data based on the recovered clock to produce even latched bits, and the circuit further includes an odd latch that is operably coupled to latch odd bits of the digital stream of data based on the recovered clock to produce odd latched bits. The detection module may be operably coupled to produce the phase representative pulse stream based on the even latched bits and the odd latched bits. The compensating module may be operably coupled to adjust biasing of the even latch and the odd latch based on the operating parameter changes of the clock and data recovery circuit. In some embodiments the circuit further includes a data recovery module that is operably coupled to produce recovered data from the latched bits based on the recovered clock.

In another embodiment of the invention, a parameter compensated logic circuit includes a logic module and a compensating module. The logic module is operably coupled to perform a logic function upon input data. The compensating module is operably coupled to adjust biasing of the logic module based on changes of operating parameters of the logic module, wherein adjusting the biasing of the logic module substantially stabilizes performance of the logic module as the operating parameters change.

In yet another embodiment of the present invention, a clock and data recovery circuit includes a latch, a detection module, a clock recovery module, and a compensating module. The latch is operably coupled to latch bits of a digital stream of data based on a recovered clock to produce latched bits. The detection module is operably coupled to produce a phase representative pulse stream based on the latched bits. The clock recovery module is operably coupled to produce the recovered clock based on the phase representative pulse stream. The data recovery module is operably coupled to produce recovered data from the latched bits based on the recovered clock. The compensating module is operably coupled to: sense operational parameters of the latch to produce sensed operational parameters; determine whether the latch will operate at less than a desired performance level based on the sensed operational parameters; when the latch will operate at less than the desired performance level, generate a compensation bias signal based on the sensed operational parameters; and provide the compensation bias signal to the latch to adjust the performance of the latch to the desired performance level.

DETAILED DESCRIPTION OF THE INVENTION

Figure 1:
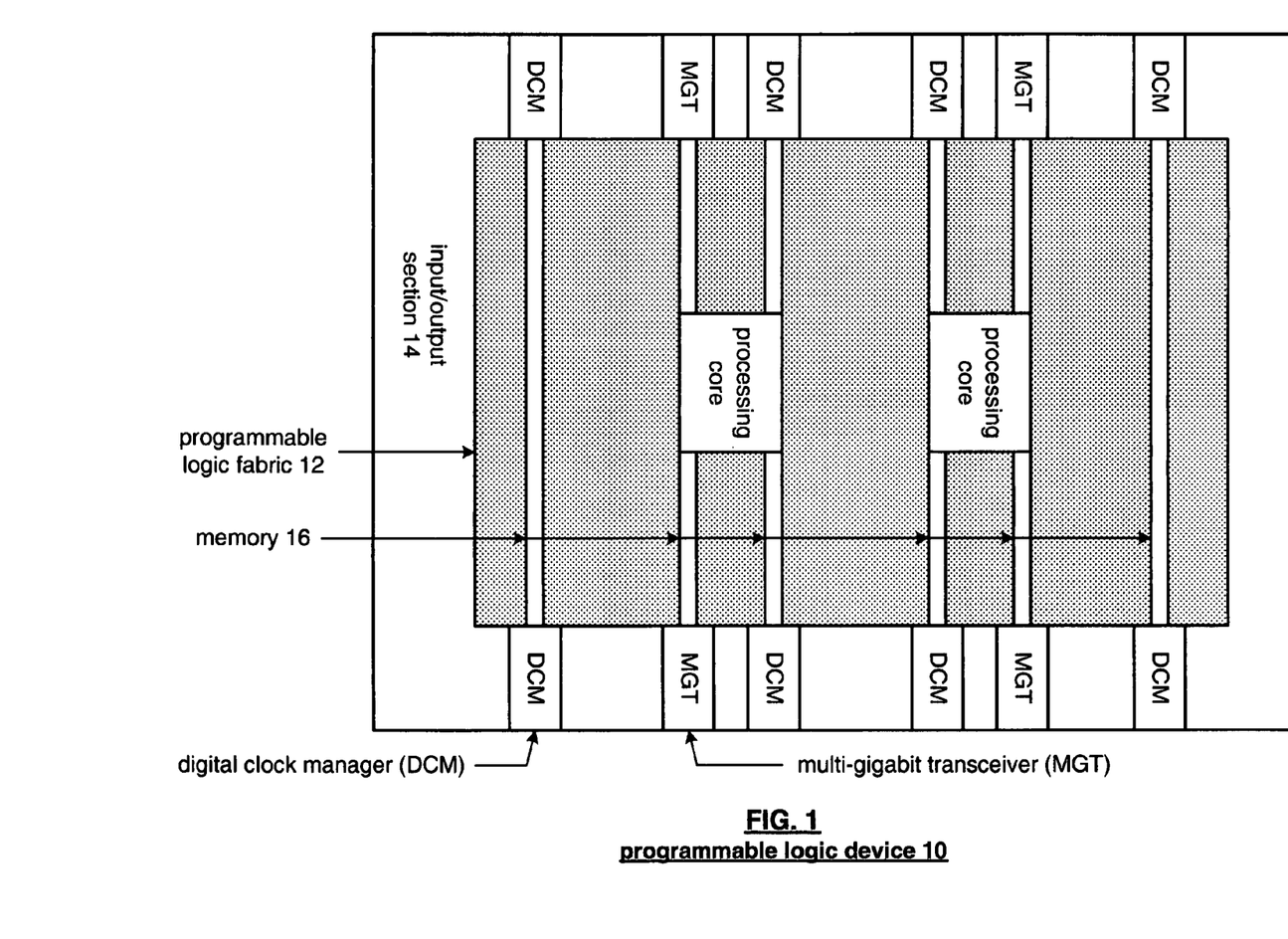
FIG. 1 is a schematic block diagram of a programmable logic device that includes programmable logic fabric, an input/output section, and memory.

FIG. 1 is a schematic block diagram of a programmable logic device 10 that includes programmable logic fabric 12, an input/output section 14, and memory 16. The programmable logic fabric 12 may include one or more processing cores and programmable logic circuitry. Such programmable logic circuitry may include programmable logic arrays (PLAS), programmable array logic (PAL) devices, erasable programmable logic devices (EPLDS) and/or programmable gate arrays (PGAs). Memory 16 may be block random access memory (BRAM). Input/output section 14 may include a plurality of digital clock managers (DCMS) and a plurality of multi-gigabit transceivers (MGTs). Other embodiments may include other resources and other arrangements for programmable logic device 10. An example of an alternate arrangement may be found in U.S. patent application Ser. No. 10/683,944, entitled "Columnar Architecture" by Young, filed on Oct. 10, 2003, which is incorporated herein in its entirety. Furthermore, other embodiments in accordance with the present invention may include devices other than programmable logic devices.

The digital clock managers provide various clock signals to the programmable logic fabric 12 and may further provide clock signals to the multi-gigabit transceivers. The multi-gigabit transceivers provide digital interfaces for the programmable logic fabric 12 to exchange data with components external to the programmable logic device 10. In general, the multi-gigabit transceivers provide serial-to-parallel conversion of received serial data and provide parallel-to-serial conversion for outgoing data. Further, the digital clock managers may, for example, provide clock signals to memory, or other input/output modules, for double data rate and quad data rate accesses.

Figure 2:
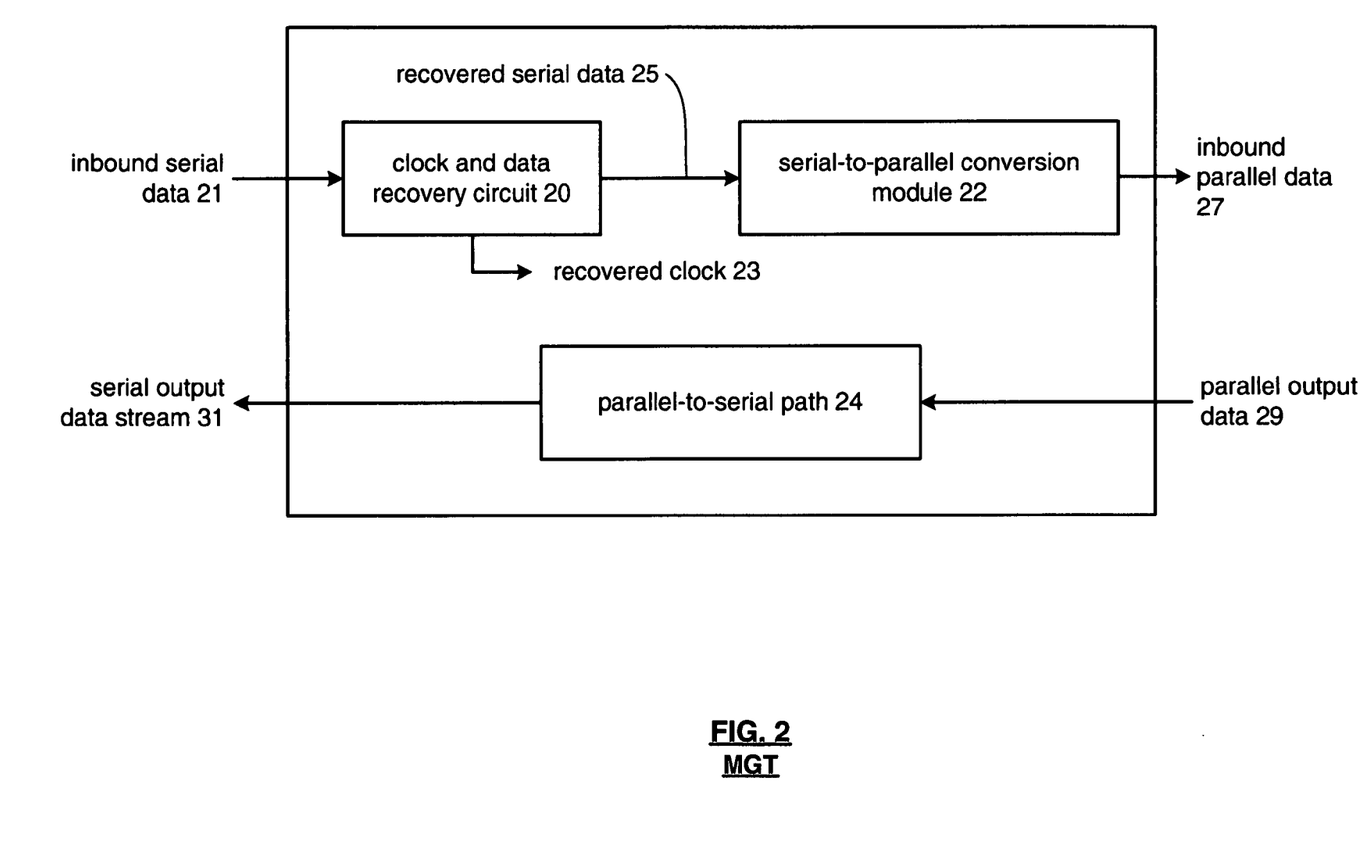
FIG. 2 is a schematic block diagram of a multi-gigabit transceiver according to one embodiment of the present invention.

FIG. 2 is a schematic block diagram of a multi-gigabit transceiver (MGT) according to one embodiment of the present invention. The MGT includes a clock and data recovery circuit 20, a serial-to-parallel conversion module 22, and a parallel-to-serial path 24. In operation, the MGT receives parallel output data 29 from the programmable logic fabric (programmable logic fabric 12 of FIG. 1), memory (memory 16 of FIG. 1), or other sources, and converts it into serial output data stream 31. To facilitate the parallel-to-serial conversion, parallel-to-serial path 24, which may include an elastic store buffer, receives parallel-to-serial settings from the processing core to indicate the width of parallel output data 29 and the data rate of the parallel data. Based on the parallel-to-serial settings and at least one transmit clock, parallel-to-serial path 24 produces serial output data stream 31 from parallel output data 29.

The MGT also receives inbound serial data 21 from a source external to programmable logic device 10 and converts it into inbound parallel data 27. Clock and data recovery circuit 20, which will be described in greater detail with reference to FIGS. 3-8, receives inbound serial data 21 and latches the serial data at a rate substantially equal to one-half the serial data rate to produce a recovered serial data 25 and a recovered clock 23. Serial-to-parallel conversion module 22, which may include an elastic store buffer, receives recovered serial data 25 at a serial rate in accordance with recovered clock 23. Based on serial-to-parallel settings received from the processing core, serial-to-parallel conversion module 22 produces the inbound parallel data 27 to downstream components. The serial-to-parallel settings indicate the data rate and data width of the inbound parallel data 27.

Figure 3:
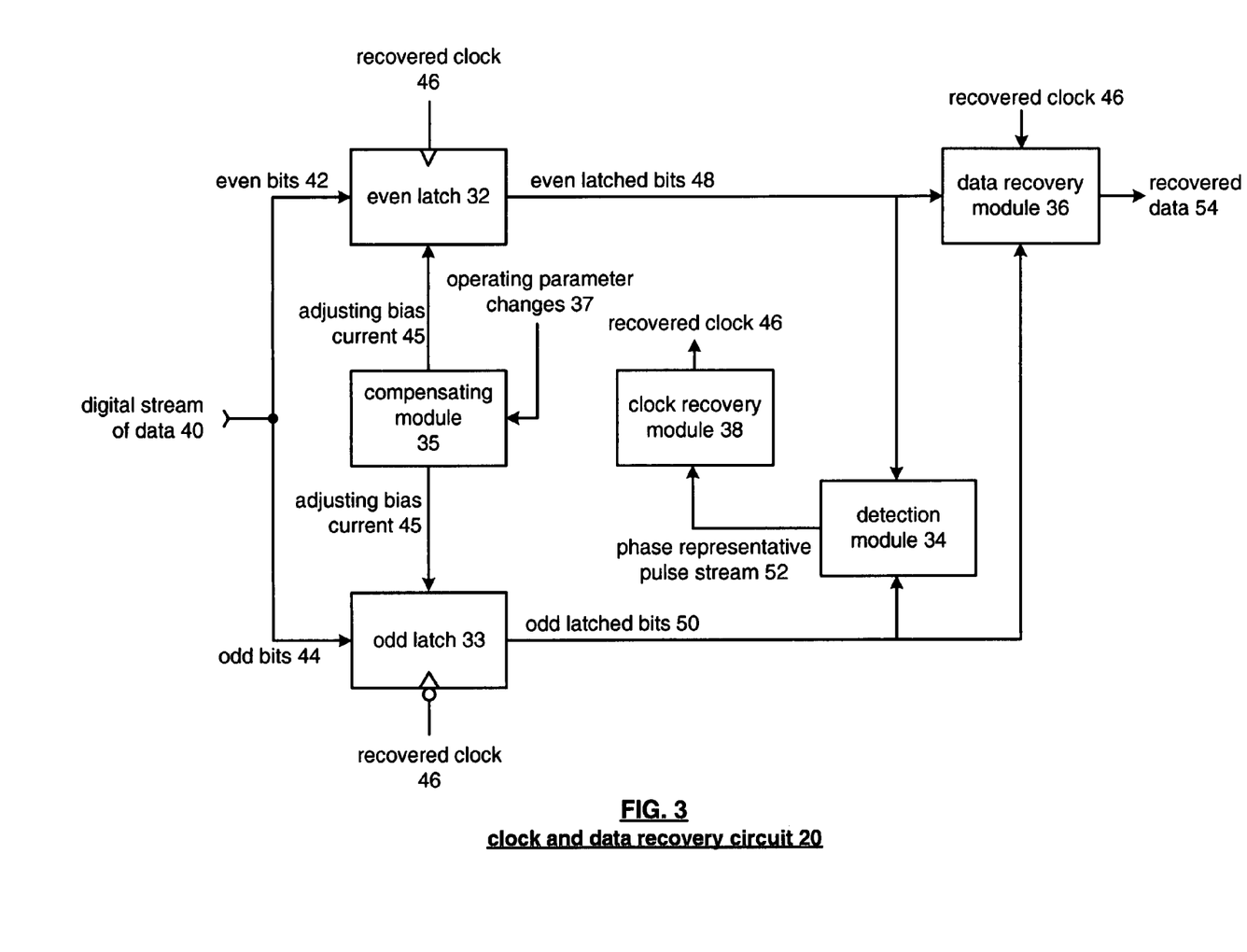
FIG. 3 is a schematic block diagram of a clock and data recovery circuit according to one embodiment of the present invention.

FIG. 3 is a schematic block diagram of a clock and data recovery circuit 20 according to one embodiment of the present invention. Clock and data recovery (CDR) circuit 20 includes an even latch 32, an odd latch 33, a detection module 34, a compensating module 35, a data recovery module 36, and a clock recovery module 38.

In operation, CDR circuit 20 receives inbound serial data 21 as a digital stream of data 40 including even bits 42 and odd bits 44 that are latched into the even latch 32 and the odd latch 33. Even latch 32 and odd latch 33 are operably coupled to produce even latched bits 48 and odd latched bits 50, respectively, at a rate corresponding to a recovered clock 46. In one embodiment, even latch 32 is a track and hold latch that tracks the amplitude changes of the digital stream of data 40 during a positive transition of recovered clock 46 and then holds the input amplitude during a negative transition of recovered clock 46 to produce even latched bits 48. Further, odd latch 33 is a track and hold latch that tracks the amplitude changes of the digital stream of data 40 during a negative transition of recovered clock 46 and then holds the input amplitude value during a positive transition of recovered clock 46. By using alternate transitions of recovered clock 46, even latch 32 and odd latch 33 produce even latched bits 48 and odd latched bits 50, respectively, at one-half the bit rate of digital stream of data 40. Note in other embodiments other latch arrangements, including more or fewer latches, may be used in accordance with the present invention. For example, in some embodiments, the CDR circuit may include a single track and hold latch, and in other embodiments may include four or eight latches.

The outputs of even latch 32 and odd latch 33 are operably coupled to detection module 34 to produce a phase representative pulse stream 52. Detection module 34, which may include at least one of an exclusive OR (XOR) gate, combinational logic, and a processor, is operably coupled to produce a logic one output whenever one of, but not both, even latched bits 48 and odd latched bits 50 are a logic one; otherwise, detection module 34 produces a logic zero. The phase representative pulse stream 52 represents a relative phase difference between the digital stream of data 40 and recovered clock 46 and is used to maintain recovered clock 46 substantially aligned to the center of a data bit period of the digital stream of data 40. When recovered clock 46 is substantially aligned to the center of the data bit period, the data in the digital stream of data 40 is accurately recovered. However, as one of average skill in the art will recognize, variations due to process, voltage, and/or temperature, can cause changes in the operating parameters of the components of CDR circuit 20. These operating parameter changes affect phase representative pulse stream 52 thereby introducing jitter into recovered clock 46. Clock jitter, or phase noise in the frequency domain, introduces errors into circuits receiving recovered clock 46, thereby generating inter-symbol interference and higher bit error rates. One aspect of the present invention is to compensate for changes in one of process, voltage, and/or temperature, by generating adjusting bias current 45, as a compensation bias signal, having a proper magnitude and polarity to substantially compensate for these changes. The operation of compensating module 35 will be discussed with respect to FIGS. 4-8.

In one embodiment, clock recovery module 38 includes a charge pump, a loop filter, and a voltage controlled oscillator (VCO) configured as a phase-locked loop to produce recovered clock 46 from phase representative pulse stream 52.

In one embodiment, data recovery module 36 includes a pair of master slave latches (not shown) clocked on positive and negative transitions of recovered clock 46 to produce serial data as recovered data 54.

Compensating module 35 includes a supply voltage sensing module and a property variation sensing module to sense changes in operating parameters. In operation, compensating module 35 changes adjusting bias current 45 that, when combined with a latch bias of even latch 32 and odd latch 33, adjusts the operating parameters of latches 32 and 33 to substantially compensate for the changes due to one of process, voltage, and/or temperature variations. In one embodiment, compensating module 35 further includes a nanomachine device to detect and compensate for a change in at least one of velocity, shock, vibration, and atmospheric pressure. In yet another embodiment, a monitored component of compensating module 35 is formed to substantially compensate for changes in biasing point parameters as a result of external radiation. The operation of compensating module 35 will be discussed in greater detail with respect to FIGS. 4-8.

As can be seen in FIG. 3, adjusting bias current 45 is operably coupled from compensating module 35 to even latch 32 and odd latch 33. Even latch 32 and odd latch 33 must operate at the full data rate of digital stream of data 40 to produce even latched bits 48 and odd latched bits 50, respectively, thus their operating parameters are very sensitive to changes in operating parameters due to variations in process, voltage, and/or temperature. Due to the half-rate clock nature of CDR circuit 20, the other modules of CDR circuit 20 are less sensitive to changes in operating parameters due to process, voltage, and/or temperature, but may be compensated as well by adjusting bias current 45. Furthermore, operating parameter changes 37 operably coupled to compensating module 35 may be produced by any component within the MGT, CDR circuit 20, or programmable logic device 10 based on the components' sensitivity to operating parameter changes.

Figure 4:
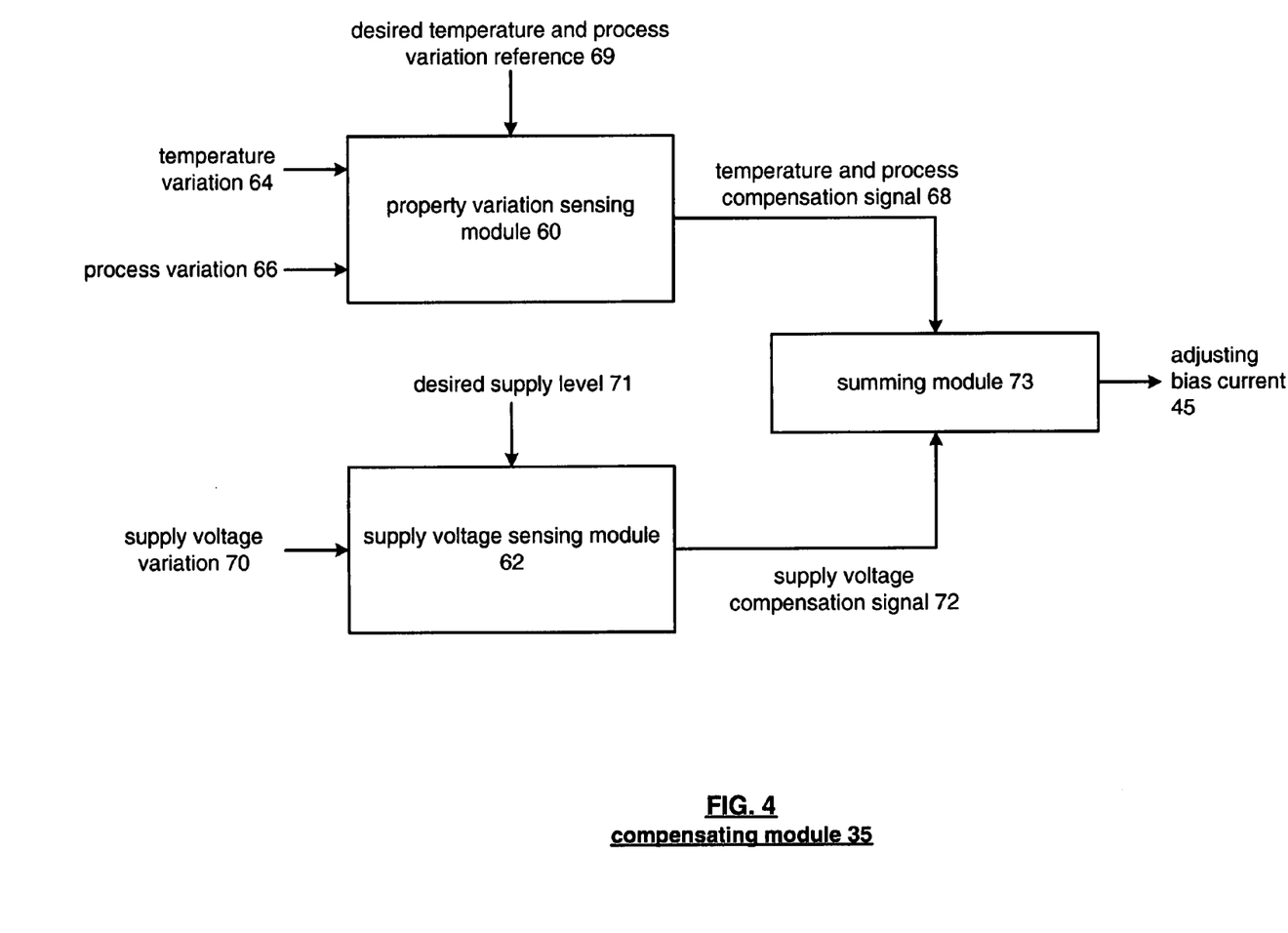
FIG. 4 is a schematic block diagram of an embodiment of a compensating module.

FIG. 4 is a schematic block diagram of an embodiment of compensating module 35. In this embodiment, compensating module 35 includes a property variation sensing module 60, a supply voltage sensing module 62, and a summing module 73. Property variation sensing module 60 is operably coupled to receive a desired temperature and process variation reference 69, a temperature variation 64, and a process variation 66, to produce temperature and process compensation signal 68. Property variation sensing module 60 includes a monitored component that substantially matches components within the even and odd latches to produce temperature and process compensation signal 68 based on the desired temperature and process variation reference 69, temperature variation 64, and process variation 66.

Supply voltage sensing module 62 is operably coupled to receive a desired supply level 71 and a supply voltage variation 70 to sense variation in the supply voltage of CDR circuit 20 and the MGT to produce a supply voltage compensation signal 72. Temperature variation 64, process variation 66, and supply voltage variation 70 may be coupled from any component of CDR circuit 20 or the MGT, based on the susceptibility of operating parameters to changes in one of process, voltage, and/or temperature.

Summing module 73 is operably coupled to receive temperature and process compensation signal 68 and supply voltage compensation signal 72 to produce adjusting bias current 45. Sensing components within summing module 73 produce adjusting bias current 45 in response to changes in temperature and process compensation signal 68 and supply voltage compensation signal 72.

Figure 5:
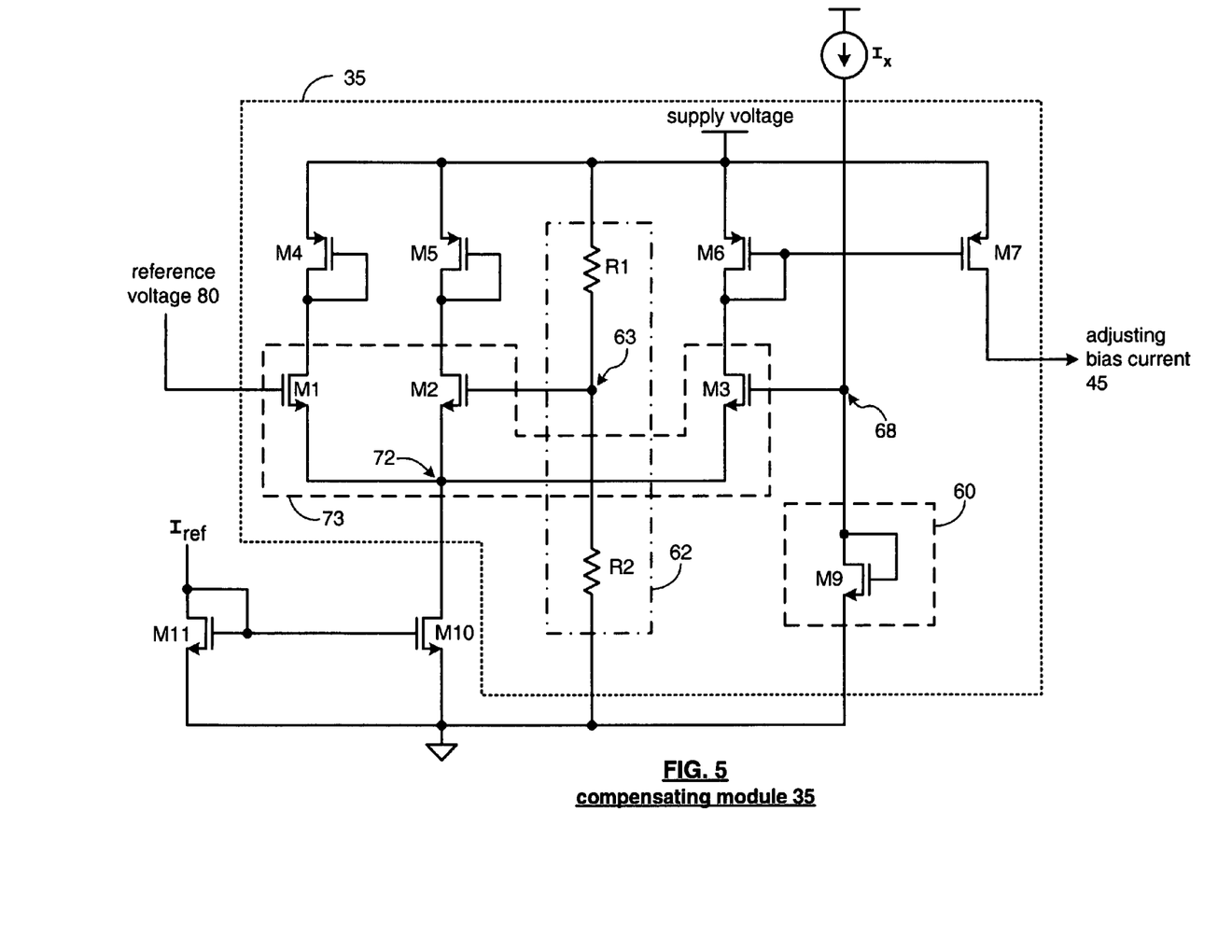
FIG. 5 is a schematic block diagram of another embodiment of a compensating module.

FIG. 5 is a schematic block diagram of another embodiment of compensating module 35. In this embodiment, compensating module 35 includes property variation sensing module 60, supply voltage sensing module 62, and summing module 73.

Property variation sensing module 60 includes a monitored component to produce temperature and process compensation signal 68 based on a desired temperature and process variation reference. In operation, property variation sensing module 60 is operably coupled to sense temperature and process variations of components external to compensating module 35, such as the even and odd latches of the clock and data recovery circuit 20, to produce temperature and process compensation signal 68. The properties of the monitored component are substantially matched to the external components such that variations in one of temperature and process in the external components are substantially matched by corresponding variations in the monitored component. In response to the variations, property variation sensing module 60 produces temperature and process compensation signal 68 to substantially compensate for the temperature and process variations in the external components.

Supply voltage sensing module 62 includes a supply voltage sensing circuit to sense variations in the supply voltage and to produce supply voltage compensation signal 63 to substantially compensate for the supply voltage variations in the external components.

Summing module 73 includes sensing component transistors M1, M2, and M3 operably coupled to summing node 72. Based on the desired temperature and process variation reference and the desired supply level, summing module 73 produces adjusting bias current 45 that is operably coupled to the biasing circuits of the external devices such that the external components operate within desired operating parameters. In operation, changes in one of temperature, process, or supply voltage produces corresponding changes in either temperature and process compensation signal 68 or supply voltage compensation signal 63 operably coupled to summing module 73. Sensing component transistors M1, M2, and M3 of summing module 73 produce a corresponding change in adjusting bias current 45 to adjust the biasing current of the external component such that the effects of the variations in the operating conditions of the external component are substantially reduced.

Monitored component M9 of property variation sensing module 60 receives an external current $I_x$ to produce temperature and process compensation signal 68 to sensing component transistor M3 of summing module 73. Based on a desired temperature and process variation reference, monitored component M9 operably couples temperature and process compensation signal 68 as a bias signal to sensing component transistor M3 to set a nominal current in transistor M3. The current conducted by sensing component transistor M3 is mirrored in transistors M6 and M7 to produce adjusting bias current 45.

Supply voltage sensing module 62 includes resistive elements R1 and R2 configured to scale the supply voltage to produce supply voltage compensation signal 63. Supply voltage compensation signal 63 is coupled to transistor M2 that sets a nominal current through transistor M2 based on a desired supply level. An external reference voltage 80 coupled to a reference circuit including transistors M1 and M4 sets a nominal current through transistor M1. When operating within desired operating parameters, temperature and process compensation signal 68, supply voltage compensation signal 63, and reference voltage 80 are approximately equal.

An external reference current $I_{ref}$ operably coupled to a current mirror of compensating module 35 sets a reference current in summing node 72 that is the sum of the nominal currents conducted by transistors M1, M2, and M3. When operating within desired operating parameters, the nominal currents conducted by transistors M1, M2, and M3 are approximately equal.

In response to a change in one of temperature and process variations, monitored component M9 of property variation sensing module 60 produces a corresponding change in temperature and process compensation signal 68 which functions to change the biasing on sensing component transistor M3 of summing module 73. The change in the current conducted by sensing component transistor M3 further causes an increase or decrease in adjusting bias current 45 to substantially compensate for the change in one of temperature or process variations in the external component. Similarly, a variation in the supply voltage causes a corresponding change in the supply voltage compensation signal 63 produced by resistive elements R1 and R2 resulting in a change in the current conducted by transistor M2. Since the net current produced by the reference circuit and the current mirror remains substantially the same, the change in the current conducted by transistor M2 changes the current conducted by sensing component transistor M3. Thus, a variation in the supply voltage of supply voltage sensing module 62 causes a corresponding change in adjusting bias current 45. The change in adjusting bias current 45 coupled to the biasing circuit of the external component, for example, even and odd latches of CDR circuit 20, substantially compensates for the variation in the supply voltage.

If the supply voltage increases, for example, the latch bandwidth and latch drain current increase proportionally with the increase in supply voltage. This variation in latch parameters causes offset variations in clock and data recovery resulting in degraded data detection performance and increased probability of detection errors. Supply voltage compensation signal 63 increases with an increase in supply voltage. The increase in supply voltage compensation signal 63 increases the gate-to-source voltage on transistor M2 which causes an increase in the current conducted by M2. Because the net current conducted by transistor M10 is fixed, sensing component transistor M3 conducts less current in response to the increase in current conducted by M2. The decrease in current conducted by M3 is mirrored in transistors M6 and M7. Thus, the increase in supply voltage causes a reduction in adjusting bias current 45 to proportionally decrease the latch drain current and latch bandwidth.

If the latch temperature increases, the electron mobility goes down resulting in a reduction in latch transistor transconductance and latch bandwidth. The reduction in transistor transconductance also causes a reduction in transistor drain current. The loss of bandwidth in even latch 32 and odd latch 33 of clock and data recover circuit 20 reduces their response to the high-speed digital stream of data and may result in one of data and clock recovery errors.

In response to an increase in latch temperature, the electron mobility of monitored component M9 decreases causing an increase in resistance and a corresponding increase in temperature and process compensation signal 68 coupled as a bias signal to sensing component transistor M3. The increased bias increases the drain current which is mirrored by transistors M6 and M7 to increase adjusting bias current 45 thereby substantially compensating for the reduction in bandwidth of the latch.

Figure 6:
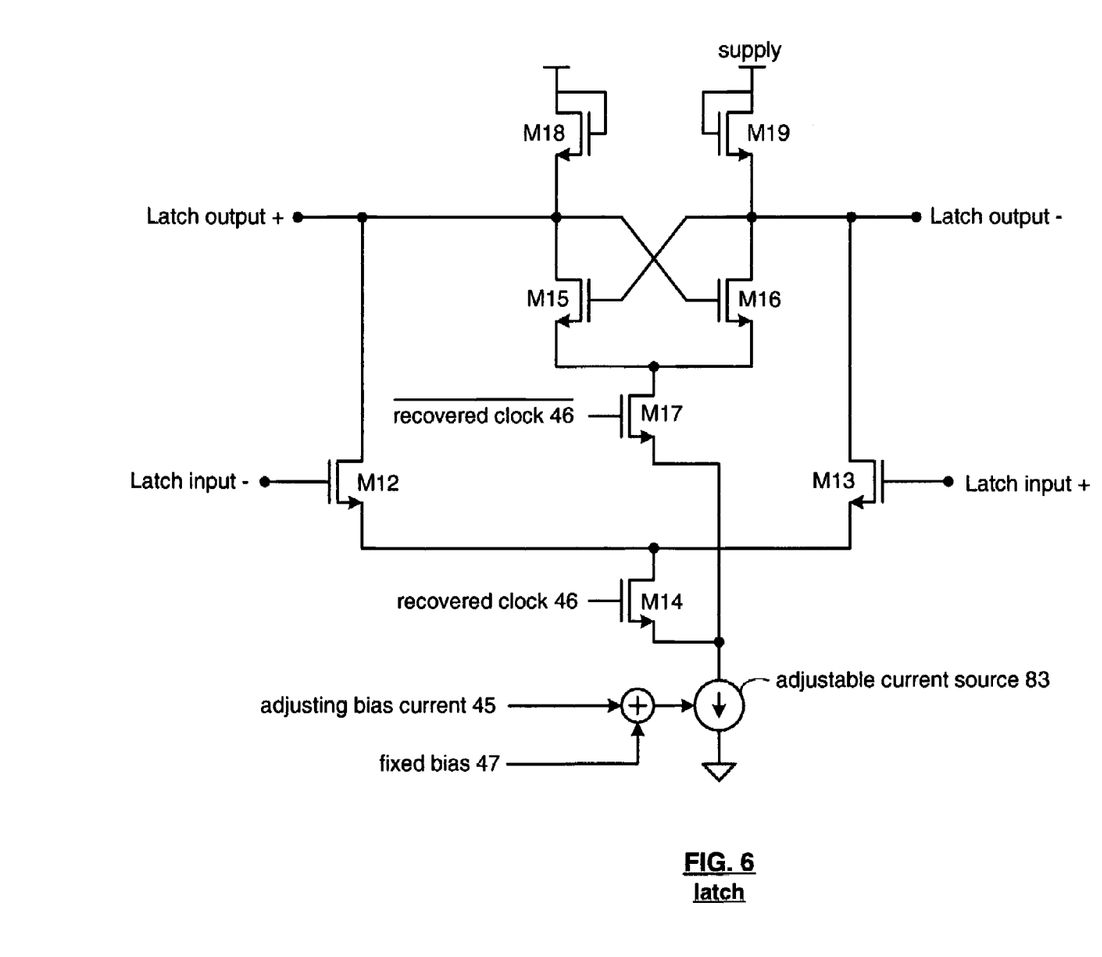
FIG. 6 is a schematic block diagram of an embodiment of an even and/or odd latch.

FIG. 6 is a schematic block diagram of an embodiment of the even and/or odd latch. In this embodiment, the latch, configured as a track and hold latch, includes differential input transistors, latching transistors, load transistors, and a latch bias configured as an adjustable current source. The latched output includes one of even latched bits 48 or odd latched bits 50 of FIG. 3, when the latch of FIG. 6 is coupled as even latch 32 or odd latch 33, respectively.

In operation, a differential input operably coupled to differential input transistors M12 and M13 produces a corresponding latch output during a positive transition of recovered clock 46 coupled to switching transistor M14. Latching transistors M15 and M16 hold or latch the latch output voltage during a negative transition of recovered clock 46 coupled to switching transistor M17. Adjustable current source 83 sets a nominal drain current for the differential input transistors and latching transistors based on fixed bias 47 and adjusting bias current 45. The nominal drain current level sets a desired latch output voltage swing across load transistors M18 and M19, gain and bandwidth.

The positive transition of recovered clock 46 turns on switching transistor M14 which turns on differential input transistors M12 and M13. Differential input transistors M12 and M13 convert the latch input voltage into an output current operably coupled to load transistors M18 and M19. The magnitude of the latch output is a function of the gate-to-source voltage produced by the latch input, the gain or transconductance of the differential input transistors, and the resistance of the load transistors.

The negative transition of recovered clock 46 turns switching transistor M14 off and turns switching transistor M17 on, thereby turning off differential input transistors M12 and M13 while biasing latching transistors M15 and M16 into operation. As can be seen in FIG. 6, latching transistors M15 and M16 have cross-coupled gates and drains such that when latching transistors M15 and M16 are biased into operation by a negative transition of recovered clock 46, latching transistors M15 and M16 latch, or hold, the magnitude of the latch output. For example, assume the latch output + is at a high level and the latch output − is at a low level during the negative transition of recovered clock 46. The high level coupled to the gate of latching transistor M16 causes it to conduct current approximately equal to the current of adjustable current source 83. The voltage drop across load transistor M19 holds the latch output − at the low level. Additionally, the low level at the latch output − coupled to the gate of latching transistor M15 turns the transistor off so the minimal current flow through load transistor M18 maintains the high level at the latch output + substantially equal to the supply voltage less one threshold voltage. Furthermore, because differential input transistors M12 and M13 are turned off, the latch output is unaffected by changes in the latch input.

Adjusting bias current 45, received from compensating module 35 of FIG. 5, and summed with fixed bias 47 compensates the latch for one or more of process variation, voltage variation, and/or temperature variation by changing the magnitude of the current produced by adjustable current source 83. If the latch temperature increases, for example, the AC component of the drain current of the transistors and the bandwidth of the latch are reduced due to the reduced transistor transconductance resulting from reduced electron mobility. The loss of bandwidth in even latch 32 and odd latch 33 of clock and data recover circuit 20 reduces their response to the high-speed digital stream of data which increases inter-symbol interference and may result in an increase in data and clock recovery errors. In this scenario, compensating module 35 of FIG. 5 increases adjusting bias current 45 which increases the biasing current conducted by adjustable current source 83 and consequently increases the current conducted by the latch to substantially compensate for the reduction in the AC component of the drain current and latch bandwidth. Similarly, in response to an increase in drain current and latch bandwidth due to a decrease in latch temperature, a reduction in adjusting bias current 45 causes a reduction in adjustable current source 83 to lower the drain current and to lower the transistor transconductance and, consequently, lower the bandwidth of the latch.

Figure 7:
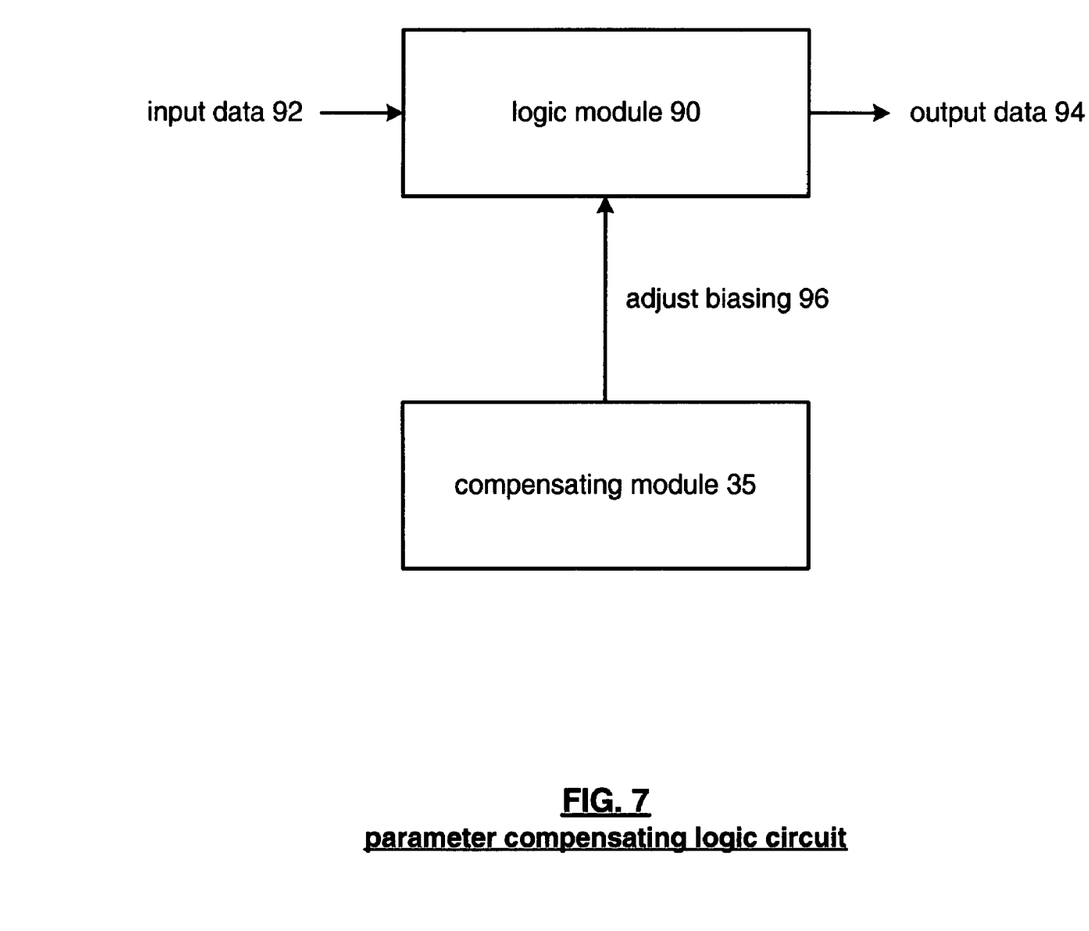
FIG. 7 is a schematic block diagram of a parameter compensating logic circuit according to one embodiment of the present invention.

FIG. 7 is a schematic block diagram of a parameter compensating logic circuit according to one embodiment of the present invention. The parameter compensating logic circuit includes a logic module 90 operably coupled to receive input data 92 and to produce output data 94, and compensating module 35 operably coupled to produce adjust biasing 96 to logic module 90. Logic module 90 includes at least one of a latch, an exclusive OR (XOR) gate, combinational logic, and a processor. As was discussed with respect to FIG. 3, compensating module 35 has monitored components that substantially match properties of components within logic module 90 such that changes in operating parameters, such as one of temperature, process, and supply voltage, produce a corresponding change in adjust biasing 96 to substantially stabilize the operating parameters of logic module 90. Stabilizing, in the context of FIG. 7, is defined as adjusting the biasing of logic module 90 so that its operating parameters are substantially maintained within a desired, or nominal, range. In one embodiment of the present invention, compensating module 35 further includes a nanomachine device to detect a change in at least one of velocity, shock, and vibration.

Figure 8:
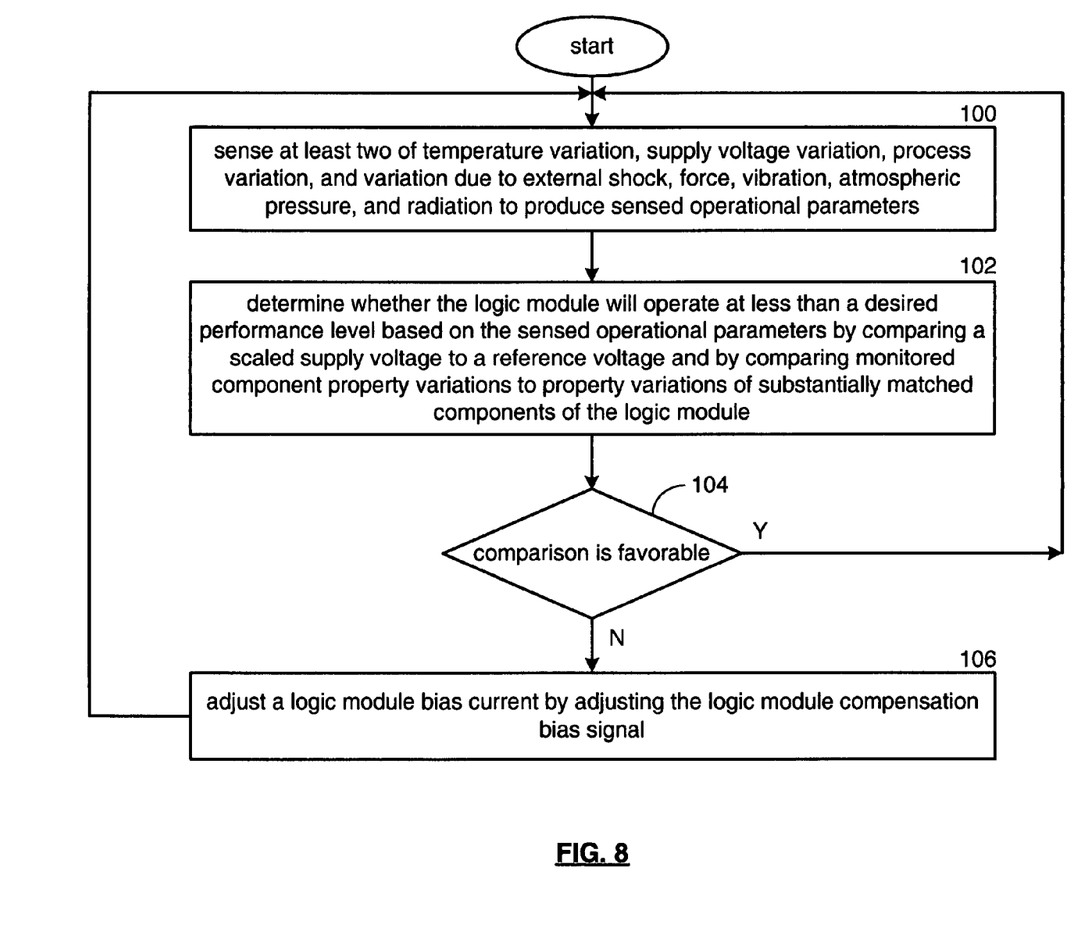
FIG. 8 is a flow chart illustrating a method for compensating a logic module according to one embodiment of the present invention.

FIG. 8 is a flowchart illustrating a method for compensating a logic module according to one embodiment of the present invention. According to the described method, a compensating module senses operational parameters of the logic module to produce sensed operational parameters, wherein the operational parameters comprise at least two of temperature variation, supply voltage variation, process variation, and variation due to external shock, force, vibration, atmospheric pressure, and radiation (step 100). The logic module includes at least one of a latch, a logic gate, an amplifier, a buffer, an active filter, a modulator, a demodulator, and a processor. The method determines whether the logic module will operate at less than a desired performance level based on the sensed operational parameters by comparing a scaled supply voltage to a reference voltage and by comparing a monitored component property variation to property variations of substantially matched components of the logic module (step 102). If the comparison is favorable (step 104) the method repeats without adjustment. If, however, the comparison is unfavorable, the method adjusts the performance of the logic module by adjusting a logic module bias current by adjusting the logic module compensation bias signal (step 106).

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for improving performance of a clock and data recovery circuit for high-speed applications by accounting for temperature, process, and/or voltage variations that produce jitter. As one of average skill in the art will appreciate, other embodiments may be derived from the teachings of the present invention without deviating from the scope of the claims.

What is claimed is:

1. A clock and data recovery circuit comprises:
a latch operably coupled to latch bits of a digital stream of data based on a recovered clock to produce latched bits;
a detection module operably coupled to produce a phase representative pulse stream based on the latched bits;
a clock recovery module operably coupled to produce the recovered clock based on the phase representative pulse stream; and
a compensating module operably coupled to adjust biasing of the latch based on operating parameter changes of the clock and data recovery circuit,
wherein the compensating module includes
a property variation sensing module operably coupled to sense temperature and process variations of components of the clock and data recovery circuit to produce a temperature and process compensation signal;
a supply voltage sensing module operably coupled to sense variations of the supply voltage of the clock and data recovery circuit to produce a supply voltage compensation signal; and
a summing module coupled to sum the temperature and process compensation signal and the supply voltage compensation signal to produce the adjusting bias current.

2. The clock and data recovery circuit of claim 1, further comprises:
a data recovery module operably coupled to produce recovered data from the latched bits based on the recovered clock.

3. The clock and data recovery circuit of claim 1 wherein the latch is an even latch operably coupled to latch even bits of the digital stream of data based on the recovered clock to produce even latched bits, the clock and data recovery circuit further comprises:
an odd latch operably coupled to latch odd bits of the digital stream of data based on the recovered clock to produce odd latched bits;
wherein the detection module is operably coupled to produce the phase representative pulse stream based on the even latched bits and the odd latched bits; and
wherein the compensating module is operably coupled to adjust biasing of the even latch and of the odd latch based on the operating parameter changes of the clock and data recovery circuit.

4. The clock and data recovery circuit of claim 3 further comprises:
a data recovery module operably coupled to produce recovered data from the even latched bits and the odd latched bits based on the recovered clock.

5. The clock and data recovery circuit of claim 3, wherein the detection module comprises at least one of an exclusive OR (XOR) gate, combinational logic, and a processor.

6. The clock and data recovery circuit of claim 3, wherein each of the even and odd latches comprises a track and hold latch.

7. The clock and data recovery circuit of claim 1 wherein the compensating module further functions to:
supply the adjusting bias current to the latch to adjust the biasing of the latch.

8. The clock and data recovery circuit of claim 1, wherein the property variation sensing module comprises a monitored component to produce the temperature and process compensation signal based on a desired temperature and process variation reference.

9. The clock and data recovery circuit of claim 8 wherein properties of the monitored component substantially match properties of components within the latch.

10. The clock and data recovery circuit of claim 8, wherein the supply voltage sensing module comprises a supply voltage sensing circuit to produce a sensed supply voltage signal based on the supply voltage and a desired supply level.

11. A parameter compensated logic circuit comprises:
a logic module operably coupled to perform a logic function upon input data; and
a compensating module operably coupled to adjust biasing of the logic module based on changes of operating parameters of the logic module, wherein adjusting the biasing of the logic module substantially stabilizes performance of the logic module as operating parameters change,
wherein the compensating module includes
a property variation sensing module operably coupled to sense temperature and process variations of components of the logic module to produce a temperature and process compensation signal;
a supply voltage sensing module operably coupled to sense variations of a supply voltage of the logic module to produce a supply voltage compensation signal; and
a summing module operably coupled to sum the temperature and process compensation signal and the supply voltage compensation signal to produce an adjusting bias current.

12. The parameter compensated logic circuit of claim 11 wherein the logic module comprises at least one of a latch, an exclusive OR (XOR) gate, combinational logic, and a processor.

13. The parameter compensated logic circuit of claim 11, wherein the property variation sensing module comprises a monitored component to produce the temperature and process compensation signal based on a desired temperature and process variation reference.

14. The parameter compensated logic circuit of claim 13 wherein, properties of the monitored component substantially match properties of components within the logic module.

15. The parameter compensated logic circuit of claim 11, wherein the supply voltage sensing module comprises a supply voltage sensing circuit to produce a sensed supply voltage signal based on the supply voltage and a desired supply level.

16. The parameter compensated logic circuit of claim 11 wherein the logic module comprises at least one transconductance circuit that is at least partially biased based on the biasing from the compensating module.

17. A method for compensating a logic module, the method comprises:
sensing operational parameters of the logic module to produce sensed operational parameters;
determining whether the logic module will operate at less than a desired performance level based on the sensed operational parameters;
when the logic module will operate at less than the desired performance level, generating a compensation bias signal based on the sensed operational parameters; and
adjusting performance of the logic module based on the compensation bias signal,
wherein generating the compensation bias signal includes
generating a temperature and process compensation signal to compensate for temperature and process variations of the logic module;
generating a supply voltage compensation signal to compensate for variations of the supply voltage of the logic module; and
combining the temperature and process compensation signal and the supply voltage compensation signal to generate the compensation bias signal.

18. The method of claim 17 wherein the logic module comprises at least one of a latch, a logic gate, an amplifier, a buffer, an active filter, a modulator, a demodulator, and a processor.

19. The method of claim 17 wherein the operational parameters comprise at least two of temperature variation, supply voltage variation, process variation, and variation due to external shock, force, vibration, atmospheric pressure, and radiation.

20. The method of claim 17 comprises:
the sensing operational parameters includes:
comparing a scaled supply voltage to a reference voltage;
comparing a monitored component property variations to property variations of substantially matched components of the logic module; and
the adjusting the performance of the logic module includes:

when the comparing is unfavorable, adjusting a logic module bias current by adjusting the logic module compensation bias signal based on the comparing.

21. A clock and data recovery circuit comprises:
a latch operably coupled to latch bits of a digital stream of data based on a recovered clock to produce latched bits;
a detection module operably coupled to produce a phase representative pulse stream based on the latched bits;
a clock recovery module operably coupled to produce the recovered clock based on the phase representative pulse stream; and
a compensating module operably coupled to:
sense operational parameters of the latch to produce sensed operational parameters;
determine whether the latch will operate at less than a desired performance level based on the sensed operational parameters;
when the latch will operate at less than the desired performance level, generate a compensation bias signal based on the sensed operational parameters; and
provide the compensation bias signal to the latch to adjust the performance of the latch to the desired performance level,
wherein generating the compensation bias signal includes
generating a temperature and process compensation signal to compensate for temperature and process variations of the latch;
generating a supply voltage compensation signal to compensate for variations of the supply voltage of the latch; and
combining the temperature and process compensation signal and the supply voltage compensation signal to generate the compensation bias signal.

22. The clock and data recovery circuit of claim 21 further comprises:
a data recovery module operably coupled to produce recovered data from the latched bits based on the recovered clock.

23. The clock and data recovery circuit of claim 21, wherein the latch is an even latch operably coupled to latch even bits of the digital stream of data based on the recovered clock to produce even latched bits, the clock and data recovery circuit further comprises:
an odd latch operably coupled to latch odd bits of the digital stream of data based on the recovered clock to produce odd latched bits;

wherein the detection module is operably coupled to produce the phase representative pulse stream based on the even latched bits and the odd latched bits; and
wherein the compensating module is operably coupled to:
sense operational parameters of the even and odd latches to produce the sensed operational parameters;
determine whether the even and odd latches will operate at less than a desired performance level based on the sensed operational parameters;
when the even and odd latches will operate at less than the desired performance level, generate the compensation bias signal based on the sensed operational parameters; and
provide the compensation bias signal to the even and odd latches to adjust the performance of the even and odd latches to the desired performance level.

24. The clock and data recovery circuit of claim 23 further comprises:
a data recovery module operably coupled to produce recovered data from the even latched bits and the odd latched bits based on the recovered clock.

25. The clock and data recovery circuit of claim 23, wherein the detection module comprises at least one of an exclusive OR gate, combinational logic and a processor.

26. The clock and data recovery circuit of claim 23 comprises:
the sensing the operational parameters includes:
comparing a scaled supply voltage to a reference voltage;
comparing a monitored component property variations to property variations of substantially matched components of the even and odd latches; and
the adjusting the performance of the even and odd latches includes:
when the comparing is unfavorable, adjust an even and odd latch bias current by adjusting the even and odd latch compensation bias signal based on the comparing.

27. The clock and data recovery circuit of claim 21, wherein the operational parameters comprise at least two of temperature variation, supply voltage variation, process variation, and variation due to external shock, force, vibration, atmospheric pressure, and radiation.

* * * * *